United States Patent [19]

Ahmed

[11] Patent Number: 5,432,727
[45] Date of Patent: Jul. 11, 1995

[54] APPARATUS FOR COMPUTING A STICKY BIT FOR A FLOATING POINT ARITHMETIC UNIT

[75] Inventor: Sadar U. Ahmed, Santa Clara, Calif.

[73] Assignee: Intergraph Corporation, Huntsville, Ala.

[21] Appl. No.: 725,417

[22] Filed: Jul. 1, 1991

Related U.S. Application Data

[63] Continuation of Ser. No. 430,852, Nov. 2, 1989, abandoned.

[51] Int. Cl.$^6$ .................................................. G06F 7/38
[52] U.S. Cl. ...................................... 314/748; 364/745; 364/768; 364/715.08
[58] Field of Search ................... 364/715.08, 748, 768, 364/746, 200, 745

[56] References Cited

U.S. PATENT DOCUMENTS

| | | | |
|---|---|---|---|
| 3,810,115 | 5/1974 | Stafford | 364/175.08 |
| 4,639,887 | 1/1987 | Farmwald | 364/748 |
| 4,698,771 | 10/1987 | Mills et al. | 364/748 |
| 4,758,972 | 7/1988 | Frazier | 364/745 |
| 4,758,974 | 7/1988 | Fields et al. | 364/748 |
| 4,789,955 | 12/1988 | Umetani | 364/745 |
| 4,807,172 | 2/1989 | Nukiyama | 364/748 |
| 4,831,575 | 5/1989 | Kuroda | 364/748 |
| 4,839,846 | 6/1989 | Hirose et al. | 364/748 |
| 4,841,467 | 1/1989 | Ho et al. | 364/748 |
| 4,858,165 | 8/1989 | Gronowski et al. | 364/748 |
| 4,858,166 | 8/1989 | Schatzberger et al. | 364/748 |
| 4,864,527 | 9/1989 | Peng et al. | 364/748 |
| 4,908,788 | 3/1990 | Fujiyama | 364/748 |
| 4,977,534 | 12/1990 | Takahashi | 364/748 |
| 4,999,800 | 3/1991 | Birger | 364/748 |
| 5,010,508 | 8/1991 | Sit et al. | 364/748 |
| 5,063,530 | 11/1991 | Eshikawa | 364/748 |
| 5,289,396 | 2/1994 | Tamiguchi | 364/737 |

*Primary Examiner*—Christopher B. Shin
*Attorney, Agent, or Firm*—Townsend and Townsend Khourie and Crew

[57] ABSTRACT

An arithmetic unit wherein a plurality of electrical signals corresponding to the mantissa is shifted and a bit signal corresponding to the sticky bit is calculated simultaneously with the calculation of the shift count. Initially, a serial approach to mantissa shifting and sticky bit calculation is employed. A parallel approach to matissa shifting and sticky bit calculation is adopted when all shift count bits are available. In one embodiment of the present invention, an exclusive OR gate is used to calculate the difference between the least significant bits of the first and second exponents. A shifter/sticky bit calculator immediately acts upon the output of the exclusive OR gate and begins shifting the mantissa and calculating the guard, round, and sticky bits. The more significant bits of the shift count are progressively generated thereafter, and the guard, round and sticky bits are calculated and the mantissa is shifted as the shift count bits become available. As soon as all shift count bits are available, a parallel approach to sticky bit calculation is adopted. Consequently, the shifted mantissa and the guard, round and sticky bits are available at the same time and much earlier than if the sticky bit were calculated according to known methods.

56 Claims, 3 Drawing Sheets

APPARATUS FOR COMPUTING A STICKY BIT FOR A FLOATING POINT ARITHMETIC UNIT

This is a continuation of application Ser. No. 07/430,852, filed Nov. 2, 1989, now abandoned.

BACKGROUND OF THE INVENTION

This invention relates to floating point arithmetic units and, more particularly, to an apparatus for computing a sticky bit for the arithmetic unit.

When numeric operands are represented in the form $A^x$, $B^y$ within a computing system, the exponents x and y must be the same when two numbers are to be added or subtracted. If the exponents differ, the binary representation of the mantissa of the number having the smaller exponent must be shifted by an amount equal to the difference between the two exponents. FIG. 1 is a shift control circuit 10, not necessarily in the prior art, which performs such shifting. Shift control circuit 10 includes subtractors 14 and 18 which receive the operand exponents, designated exp (A) and exp (B), over buses 22 and 26. Subtractor 14 performs the operation exp (A)−exp (B), and subtractor 18 performs the operation exp (B)−exp (A). The resulting data in the form of shift counts from subtractors 14 and 18 are communicated to selection logic 30 over buses 34 and 38. Selection logic 30 determines which exponent is larger (e.g., by determining which shift count is positive or negative) and communicates a selection signal to a multiplexer 42 over a bus 44. Selection logic 30 communicates the positive shift count to a shift circuit 46 over a bus 50. Multiplexer 42 receives the operand mantissa designated mantissa (A) and mantissa (B), over buses 54 and 58, respectively. Multiplexer 42 selects the mantissa to be shifted in response to the selection signal received over bus 44 and communicates the selected mantissa to shift circuit 46 over a bus 62. Shift circuit 46 shifts the selected mantissa by an amount equal to the shift count received over bus 50. The shifted mantissa then is communicated to an ALU over a bus 66.

The number of bits used to represent the mantissa depends upon the precision mode selected in the particular computer. In single precision mode, each mantissa is represented with 24 bits, whereas in double precision mode each mantissa is represented with 53 bits. Since arithmetic operations in both single and double precision mode are processed the same way, only double precision mode shall be discussed herein.

FIG. 2A is a diagram of a double precision mantissa register 70. Mantissa register 70 includes fifty-three storage locations labeled B01-B53. B53 is always 1 if denormal numbers are not supported. The programmer uses these storage locations to store the binary representation of the mantissa for use by multiplexer 42. FIG. 2B is a diagram of a double precision mantissa register 72 which may be used to store the shifted mantissa before it is communicated to the ALU. Mantissa register 72 includes fifty-three storage locations S01-S53 which are used to store the shifted mantissa. Additionally, mantissa register 72 includes three storage locations which are transparent to the programmer. These storage locations comprise a guard bit (G), a round bit (R), and a sticky bit (S) as specified by the standard IEEE 754. The guard and round bits are the first and second bits beyond rounding precision. The sticky bit (S) indicates whether or not a nonzero value in bit positions B01-B53 of mantissa register 70 was shifted out during the mantissa shifting operation. A sticky bit value of "1" indicates that a meaningful portion of the mantissa has been lost and that the result of the mathematical operation may be inaccurate. Thus, calculation and monitoring of the sticky bit is very important to conform to the standard.

One approach used to calculate the sticky bit, not necessarily in the prior art, is shown in FIG. 3. The shift count from selection logic 30 is used to generate a mask 74 which is logically ANDed to the mantissa to be shifted which is stored in register 70. The mask typically contains a "1" in the number of least significant bit positions corresponding to the shift count (e.g., if the shift count equals five, the five least significant bit positions will contain a "1"). The result of the logical AND operation is stored in a register 82. Each storage location in register 82 which contains a "1" indicates that a corresponding nonzero bit in register 70 will be lost after the shifting operation. Thereafter, a logical OR is performed on each bit in register 82 to produce the sticky bit. Thus, if at least one nonzero bit in the mantissa will be lost as a result of the shifting operation (e.g., bits B04 and B03 in register 78), then that event will be indicated by a sticky bit equal to 1. Because of hardware constraints in the calculation of the shift count, the mask pattern cannot be generated until almost all bits of the outputs of subtractors 14 and 18 are available.

A second approach to sticky bit calculation is to logically OR the actual bits that are shifted out beyond the guard and round bit positions as shifting takes place. In this approach, the final sticky bit cannot be computed until all the shifting steps are finished.

With either approach, calculation of the sticky bit ordinarily lies in a critical path in the overall arithmetic sequence, and the arithmetic operation cannot proceed until the sticky bit is available.

SUMMARY OF THE INVENTION

The present invention is directed to an arithmetic unit wherein a plurality of electrical signals corresponding to the mantissa is shifted, and a bit signal corresponding to the sticky bit is calculated simultaneously with the calculation of the shift count. Initially, a serial approach to mantissa shifting and sticky bit calculation is employed. A parallel approach to mantissa shifting and sticky bit calculation is adopted when all shift count bits are available. In one embodiment of the present invention, an exclusive OR gate is used to calculate the difference between the least significant bits of the first and second exponents. A shifter/sticky bit calculator immediately acts upon the output of the exclusive OR gate and begins shifting the mantissa and calculating the guard, round, and sticky bits. The more significant bits of the shift count are progressively generated thereafter, and the guard, round and sticky bits are calculated and the mantissa is shifted as the shift count bits become available. As soon as all shift count bits are available, a parallel approach to sticky bit calculation is adopted. Consequently, the shifted mantissa and the guard, round and sticky bits are available at the same time and much earlier than if the sticky bit were calculated according to known methods.

DETAILED DESCRIPTION OF THE PREFERRED EMBODIMENTS

Figure 1:
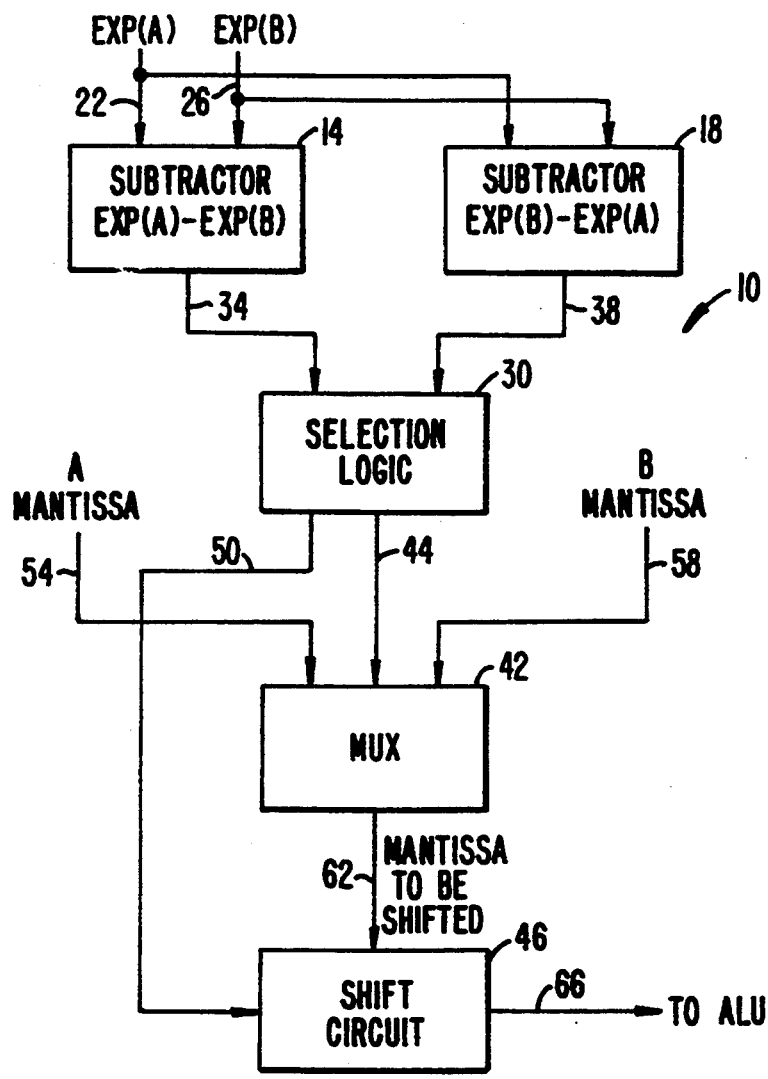
FIG. 1 is a block diagram of a known mantissa shifting circuit.
Figure 2A:
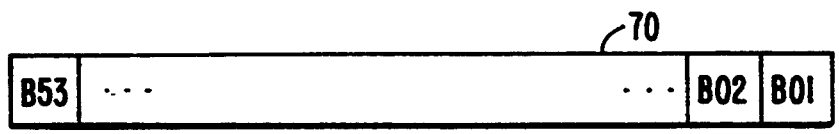
FIG. 2A is a diagram of a double precision mantissa register.
Figure 2B:
FIG. 2B is a diagram of a double precision mantissa register including guard, round and sticky bit storage locations.
Figure 3:
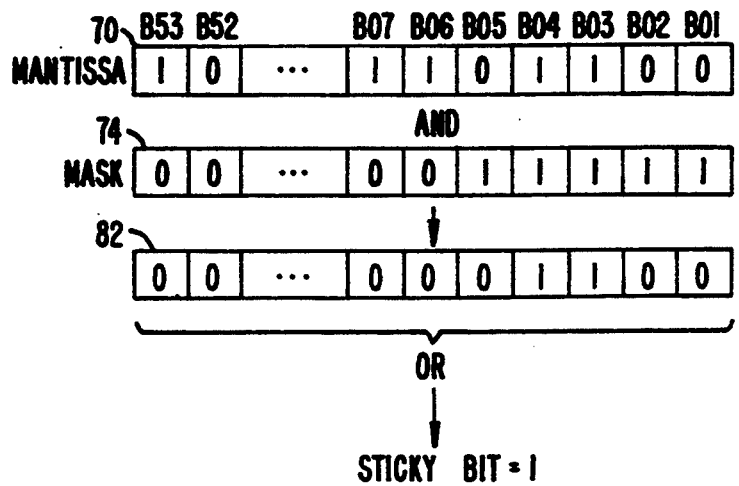
FIG. 3 is a diagram showing a known method of computing the sticky bit.
Figure 4:
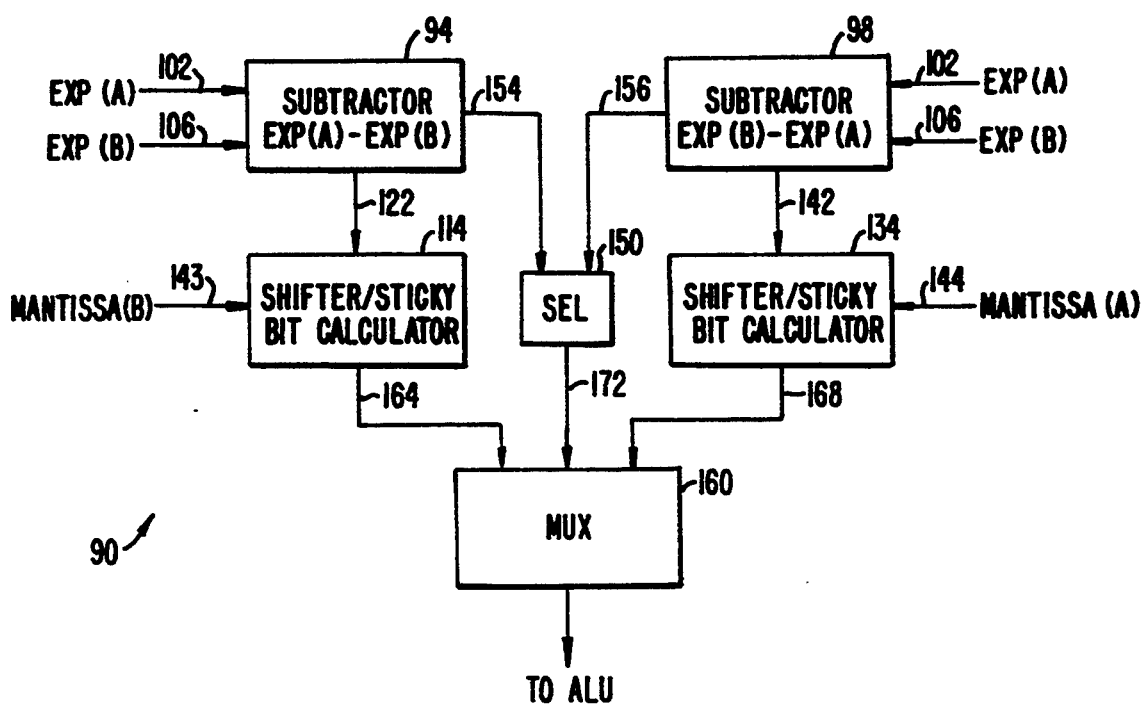
FIG. 4 is a block diagram of a particular embodiment of a mantissa shifting circuit according to the present invention.

FIG. 4 is a block diagram of a mantissa shifting circuit 90 according to the present invention. Mantissa shifting circuit 90 includes subtractors 94 and 98 which subtract the exponents of two operands to be processed. As with subtractors 14 and 18 shown in FIG. 1, subtractor 94 performs the operation (EXP(A)−EXP(B)) whereas subtractor 98 performs the operation (EXP(B)−EXP(A)). Subtractors 94 and 98 receive the values of the exponents of the two operands over buses 102 and 106. Subtractor 94 communicates with a shifter/sticky bit calculator 114 over a bus 122. Similarly, subtractor 98 communicates with a shifter/sticky bit calculator 134 over a bus 142. Shifter/sticky bit calculator 114 receives the value of mantissa (B) over a bus 143, and shifter/sticky bit calculator 134 receives the value of mantissa (A) over a bus 144. Shifter/sticky bit calculators 114 and 134 shift their associated mantissas and calculate the guard, round, and sticky bits as each output bit of their associated subtractors becomes available.

Subtractors 94 and 98 communicate with selection logic 150 over buses 154 and 156, and the shifted mantissas from shifter/sticky bit calculators 114 and 134 are communicated to a multiplexer 160 over buses 164 and 168. Since it is not known which mantissa actually needs to be shifted at the time shifting is begun, both mantissas are shifted simultaneously. The shifted mantissa to be used in the arithmetic operation is selected by multiplexer 160 in response to signals received from selector 150 over a bus 172.

Figure 5:
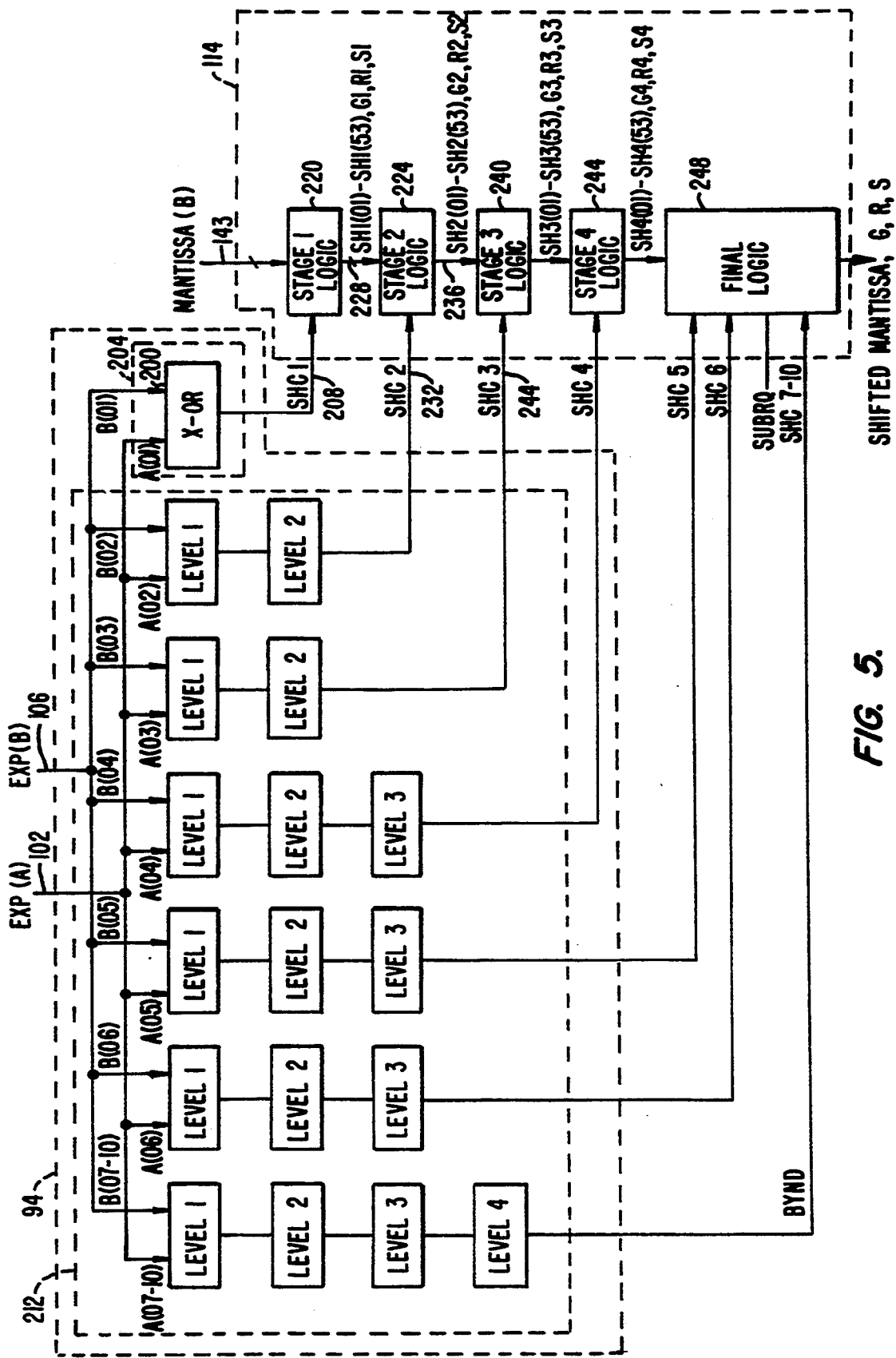
FIG. 5 is a more detailed block diagram of a particular embodiment of the shifter/sticky bit calculator according to the present invention shown in FIG. 4.

FIG. 5 is a more detailed block diagram of subtractor 94 and shifter/sticky bit calculator 114. Subtractor 98 and shifter/sticky bit calculator 134 operate in the same way, so a discussion of them shall be omitted. Unlike known subtractors such as subtractors 14 and 18 of FIG. 1, subtractor 94 is constructed to operate with a minimum number of hardware levels and to make each bit of the subtraction result available for use by shifter/sticky bit calculator 114 as soon as possible. For example, the present applicants take advantage of the fact that when any two binary numbers are subtracted, the least significant bit of the result is the same whether the first operand is subtracted from the second or vice versa. Thus, an exclusive OR gate 200 is used as a least significant bit (LSB) subtractor 204. Consequently, only a single level of logic is required to perform the subtraction operation for the least significant bit pair of the exponents, and the result of the subtraction is immediately made available to stage 1 logic 220 in shifter/sticky bit calculator 114 over a line 208.

Since the mantissa is shifted a maximum of one bit position in response to the subtraction of the least significant bit pair of the exponents, only the guard bit must be calculated from the output (SHC1) from LSB subtractor 204. The round and sticky bits are set to zero.

Stage 1 logic 220 calculates the guard bit for this stage as the logical AND of SHC1 with the least significant bit (B01) of the unshifted mantissa (B) received on bus 143. The results of the this first shift (SH1(01)−SH1(53)) and guard, round and sticky bit calculation (G1, R1, S1) are communicated to stage 2 logic 224 over a bus 228.

The more significant bit positions of the exponents are processed with a more significant bit (MSB) subtractor 212. Once again, the minimum number of hardware levels is employed for the subtraction of each exponent bit pair. Subtraction of bit pairs 2–3 of the exponents typically requires two logic levels, subtraction of bit pairs 4–6 of the exponents typically requires three logic levels, and subtraction of bit pairs 7–10 of the exponents requires four logic levels.

The second shift count bit (SHC2) becomes available from MSB subtractor 212 at or before the time that stage 1 logic produces its output on bus 228. Stage 2 logic 224 further shifts mantissa (B) by 2 positions if SHC2 is true. Thus, the guard bit G2 is calculated as either the previous guard bit G1, if no shifting is to occur, or bit 2 (SH1(02)) of the previously shifted mantissa (B) appearing on bus 228. The selection is obtained by the logical operation G2=G1*$\overline{SHC2}$+SH1(02)*SHC2 where * is a logical AND operation and + is a logical OR operation. The round bit R2 is calculated by the logical operation R2=SHC2*SH1(01). The sticky bit S2 is calculated by the logical operation S2=G1*SHC2. Thus, if SHC2 is true, the guard and round bits are the bit positions 2 and 1, respectively of the output from stage 1 logic 220, and the sticky bit is the previous guard bit. Otherwise, the guard, round and sticky bits are the same as their previous values.

Bit 3 of the shift count (SHC3) is available at or before the time that stage 2 logic produces its output on bus 236, and this bit represents a possible additional shift of four bits of the mantissa appearing on bus 236. Accordingly, stage 3 logic 240 shifts the value of mantissa (B) received on bus 236 by four positions if SHC3 is true.

A general algorithm may be provided for the calculation of the guard, round and sticky bits for this shift and all shifts hereafter. For some integer N>1, the guard bit is calculated for the Nth shift as G(N)=(A*B)+(C*D) wherein A is the value of the guard bit for the (N−1)th shift; B is the inverted value of bit N of the shift count; C is the $2^{(N-1)}$th bit of the (N−1)th shifted binary number (e.g., SH2(4) for N=3); and D is the value of bit N of the shift count.

For some integer M>2, the round bit for an Mth shift is calculated as R(M)=(E*F)+(G*H) wherein E is the value of the round bit for the (M−1)th shift; F is the inverted value of bit M of the shift count; G is the value of the $(2^{(M-1)}-1)$th bit of the (M−1)th shifted binary number (e.g., SH2(3) for M=3); and H is the value of bit M of the shift count.

For some integer L>2, the sticky bit for an Lth shift is calculated as S(L)=P+Q*(R+S+T) where P is the value of the sticky bit for the (L−1)th shift; Q is the value of bit L of the shift count; R is the logical OR of the $(2^{(L-1)}-2)$ least significant bits of the (L−1)th shifted binary number; S is the guard bit for the (L−1)th shift; and T is the round bit for the (L−1)th shift.

The remaining shift count bits (SHC4–SHC10) typically require three or four logical levels to calculate them. As a result, the remaining shift count bits are available at the fourth shift, and a parallel approach to shifting may be adopted at this time. In this embodiment, however, parallel processing is delayed for one more shift (i.e., the fourth shift). After the fourth shift, the parallel approach is adopted.

To implement parallel processing in this embodiment, the mantissa bits from stage 4 logic 244 are grouped together. For example, bits SH4(01)–SH4(13) form one group, bits SH4(14)–SH4(29) form a second group, and bits SH4(30)–SH4(45) form a third group. Let SA equal the logical OR of all bits in the first group, let SB equal the logical OR of all bits of the second group, and let SC equal the logical OR of all bits in the third group. Then let SHBYND equal the logical OR of bits 7–10 of the shift count. A value of one for SHBYND indicates that all bits in the mantissa register have been shifted out, since bits 7–10 of the shift count represent a shift of 64 or more, assuming denormal numbers are not supported. A slight modification of SHBYND is necessary if denormal numbers are supported. Two partial sticky bits are calculated in final logic 248: STK1=(G4+R4)*(SHC5+SHC6)+SHBYND+S2-+S3+S4, and STK2=SHC6*SHC5*SC+SHC6*(SB+SA)+SHC5-*SA. The final sticky bit then is calculated as S(final)=STK1+STK2.

While the above is a description of a preferred embodiment of the present invention, various modifications may be employed. Consequently, the scope of the invention should not be limited except as described in the claims.

What is claimed is:

1. An apparatus for shifting a plurality of electrical signals comprising:
   electrical signal receiving means for receiving the plurality of electrical signals;
   bit signal receiving means for receiving a first plurality of bit signals corresponding to a binary representation of an exponent of a first floating-point number and a second plurality of bit signals corresponding to a binary representation of an exponent of a second floating-point number, each first plurality of bit signals and second plurality of bits signals comprising a least significant bit (LSB) signal and a contiguous plurality of more significant bit (MSB) signals;
   LSB comparing means, coupled to the bit signal receiving means, for comparing the LSB signal of the first plurality of bit signals to the LSB signal of the second plurality of bit signals;
   LSB difference indicating means, coupled to the LSB comparing means, for generating an LSB difference signal indicating a difference between the LSB signal of the first plurality of bit signals and the LSB signal of the second plurality of bit signals;
   initial shifting means, coupled to the electrical signal receiving means and to the LSB difference indicating means, for selectively initially shifting the plurality of electrical signals in response to the LSB difference signal;
   MSB comparing means, coupled to the bit signal receiving means, for comparing the plurality of MSB signals of the first plurality of bit signals to the plurality of MSB signals of the second plurality of bit signals at the same time that the LSB comparing means compares the LSB signal of the first plurality of bit signals to the LSB signal of the second plurality of bit signals;
   MSB difference indicating means, coupled to the MSB comparing means, for generating a plurality of MSB difference signals indicating a difference between the plurality of MSB signals of the first plurality of bit signals and the plurality of MSB signals of the second plurality of bit signals, wherein the plurality of MSB difference signals are initially generated only after the LSB difference signal is initially generated by the LSB difference indicating means; and
   further shifting means, coupled to the MSB difference indicating means and to the initial shifting means, for further selectively shifting the initially selectively shifted plurality of electrical signals received from the initial shifting means in response to the plurality of MSB difference signals.

2. An apparatus for shifting a plurality of electrical signals comprising:
   electrical signal receiving means for receiving the plurality of electrical signals;
   bit signal receiving means for receiving a first plurality of bit signals corresponding to a binary representation of an exponent of a first number and a second plurality of bit signals corresponding to a binary representation of an exponent of a second number, each first plurality of bit signals and second plurality of bit signals comprising a least significant bit (LSB) signal and a plurality of more significant bit (MSB) signals;
   LSB difference indicating means, coupled to the bit signal receiving means, for generating an LSB difference signal indicating a difference between the LSB signal of the first plurality of bit signals and the LSB signal of the second plurality of bit signals;
   initial shifting means, coupled to the electrical signal receiving means and to the LSB difference indicating means, for selectively initially shifting the plurality of electrical signals in response to the LSB difference signal;
   MSB difference indicating means, coupled to the bit signal receiving means, for generating a plurality of MSB difference signals indicating a difference between the plurality of MSB signals of the first plurality of bit signals and the plurality of MSB signals of the second plurality of bit signals; and
   wherein the plurality of MSB difference signals are initially generated only after the LSB difference signal is initially generated by the LSB difference indicating means;
   further shifting means, coupled to the MSB difference indicating means and to the initial shifting means, for further selectively shifting the initially selectively shifted plurality of electrical signals received from the initial shifting means in response to the plurality of MSB difference signals;
   wherein the MSB difference indicating means comprises a plurality of levels of logic.

3. The apparatus according to claim 2 wherein the LSB difference indicating means further comprises exclusive-OR means for calculating the exclusive-OR combination of the LSB signal of the first plurality of bit signals and the LSB signal of the second plurality of bit signals.

4. The apparatus according to claim 3 wherein the LSB difference indicating means comprises only one level of logic.

5. The apparatus according to claim 4 wherein the first plurality of bit signals corresponds to a binary representation of an exponent of a first floating-point number.

6. The apparatus according to claim 5 wherein the second plurality of bit signals corresponds to a binary representation of an exponent of a second floating-point number.

7. The apparatus according to claim 6 wherein the plurality of electrical signals corresponds to a binary representation of a mantissa of one of the first or second floating point numbers.

8. An apparatus for shifting a plurality of electrical signal comprising:
   electrical signal receiving means for receiving the plurality of electrical signals;
   bit signal receiving means for receiving a first plurality of bit signals corresponding to a binary representation of an exponent of a first number and a second plurality of bit signals corresponding to a binary representation of an exponent of a second number, each first plurality of bit signals and second plurality of bit signals comprising a least significant bit (LSB) signal and a plurality of more significant bit (MSB) signals;
   LSB difference indicating means, coupled to the bit signal receiving means, for generating an LSB difference signal indicating a difference between the LSB signal of the first plurality of bit signals and the LSB signal of the second plurality of bit signals;
   initial shifting means, coupled to the electrical signal receiving means and to the LSB difference indicating means, for selectively initially shifting the plurality of electrical signals in response to the LSB difference signal;
   MSB difference indicating means, coupled to the bit signal receiving means, for generating a plurality of MSB difference signals indicating a difference between the plurality of MSB signals of the first plurality of bit signals and the plurality of MSB signals of the second plurality of bit signals; and
   wherein the plurality of MSB difference signals are initially generated only after the LSB difference signal is initially generated by the LSB difference indicating means;
   further shifting means, coupled to the MSB difference indicating means and to the initial shifting means, for further selectively shifting the initially selectively shifted plurality of electrical signals received from the initial shifting means in response to the plurality of MSB difference signals;
   wherein the plurality of electrical signals further comprises:
      a first extra electrical signal appended to a least significant electrical signal of the plurality of electrical signals;
      a second extra electrical signal appended to the first extra electrical signal; and
      a third extra electrical signal appended to the second extra electrical signal.

9. The apparatus according to claim 8 wherein the further shifting means further comprises subsequent extra electrical signal generating means for generating the third extra electrical signal for further selective shifts of the plurality of electrical signals.

10. The apparatus according to claim 9 wherein the initial shifting means further comprises initial extra electrical signal generating means for generating the first extra electrical signal for the initial selective shift of the plurality of electrical signals.

11. The apparatus according to claim 10 wherein the initial extra electrical signal generating means includes means for generating the first extra electrical signal for the initial selective shift of the plurality of electrical signals as the logical AND of the LSB signal of the unshifted plurality of electrical signals with a signal indicating the difference between the LSB signal of the first plurality of bit signals and the LSB signal of the second plurality of bit signals.

12. The apparatus according to claim 11 wherein the initial extra electrical signal generating means includes means for generating the third extra electrical signal for the initial selective shift of the plurality of electrical signals.

13. The apparatus according to claim 12 wherein the initial extra electrical signal generating means includes means for setting the value of the third extra electrical signal equal to zero for the initial selective shift of the plurality of electrical signals.

14. The apparatus according to claim 13 wherein the LSB difference indicating means further comprises exclusive-OR means for calculating the exclusive-OR combination of the LSB signals of the first plurality of bit signals and the LSB signal of the second plurality of bit signals.

15. The apparatus according to claim 14 wherein the LSB difference indicating means comprises only one level of logic.

16. The apparatus according to claim 15 wherein the MSB difference indicating means comprises only two levels of logic for generating a signal indicating the difference between the second bit signal of the first plurality of bit signals and the second bit signal of the second plurality of bit signals.

17. The apparatus according to claim 10 wherein the subsequent extra electrical signal generating means includes means for generating the third extra electrical signal for a second selective shift of the plurality of electrical signals as a logical AND of the first extra electrical signal from the initial selective shift of the plurality of electrical signals with a signal indicating a difference between a MSB signal pair from the first plurality of bit signals and the second plurality of bit signals.

18. The apparatus according to claim 17 wherein the subsequent extra electrical signal generating means includes means for generating the first extra electrical signal for further selection shifts of the plurality of electrical signals.

19. The apparatus according to claim 18 wherein, for some integer N greater than one, the subsequent extra electrical signal generating means includes means for generating the first extra electrical signal for an Nth selective shift as $(A*B)+(C*D)$ wherein:
   A is the value of the first extra electrical signal from the $(N-1)$th selective shift;
   B is an inverted signal indicating the difference between the Nth bit signal of the first plurality of bit signals and the Nth bit signal of the second plurality of bit signals;

C is the value of the $2^{(N-1)}$th electrical signal from the (N−1)th selectively shifted plurality of electrical signals;

D is the signal indicating the difference between the Nth bit signal of the first plurality of bit signals and the Nth bit signal of the second plurality of bit signals;

* represents a logical AND operation; and

+ represents a logical OR operation.

20. The apparatus according to claim 19 wherein the subsequent extra electrical signal generating means includes means for generating the second extra electrical signal for further selective shifts of the plurality of electrical signals.

21. The apparatus according to claim 20 wherein the subsequent extra electrical signal generating means includes means for generating the second extra electrical signal for a second selective shift as the logical AND of the first electrical signal of the initially selectively shifted plurality of electrical signals with a signal indicating the difference between an MSB signal pair of the first plurality of bit signals and the second plurality of bit signals.

22. The apparatus according to claim 21 wherein, for some integer M greater than two, the subsequent extra electrical signal generating means includes means for generating the second extra electrical signal for an Mth selective shift as (E*F)+(G*H) wherein:

E is the value of the second extra electrical signal from the (M−1)th selective shift;

F is an inverted signal indicating the difference between the Mth bit signal of the first plurality of bit signals and the Mth bit signal of the second plurality of bit signals;

G is the value of the $(2^{(M-1)}$th electrical signal of the (M−1)th selectively shifted plurality of electrical signals; and H is a signal indicating the difference between the Mth bit signal of the first plurality of bit signals and the Mth bit signal of the second plurality of bit signals.

23. The apparatus according to claim 22 wherein, for some integer L greater than two, the subsequent extra electrical signal generating means includes means for generating the third extra electrical signal for an Lth selective shift as P+Q*(R+S+T) where P represents the value of the third extra electrical signal from the (L−1)th selectively shifted plurality of electrical signals;

Q represents a signal indicating the difference between the Lth bit signal of the first plurality of bit signals and the Lth bit signal of the second plurality of bit signals;

R represents the logical OR of the $(2^{(L-1)}-2)$ least significant electrical signals from the (L−1)th selectively shifted plurality of electrical signals;

S represents the first extra electrical signal from the (L−1)th selective shift; and T represents the second extra electrical signal from the (L−1)th selective shift.

24. The apparatus according to claim 23 wherein the initial extra electrical signal generating means includes means for generating the first extra electrical signal for the initial selective shift of the plurality of electrical signals as the logical AND of the LSB signal of the unshifted plurality of electrical signals with a signal indicating the difference between the LSB signal of the first plurality of bit signals and the LSB signal of the second plurality of bit signals.

25. The apparatus according to claim 24 wherein the initial extra electrical signal generating means includes means for generating the third extra electrical signal for the initial selective shift of the plurality of electrical signals.

26. The apparatus according to claim 25 wherein the initial extra electrical signal generating means includes means for setting the value of the third extra electrical signal equal to zero for the initial selective shift of the plurality of electrical signals.

27. The apparatus according to claim 26 wherein the LSB difference indicating means further comprises exclusive-OR means for calculating the exclusive-OR combination of the LSB signals of the first plurality of bit signals and the LSB signal of the second plurality of bit signals.

28. The apparatus according to claim 27 wherein the LSB difference indicating means comprises only one level of logic.

29. The apparatus according to claim 28 wherein the MSB difference indicating means comprises only two levels of logic for generating a signal indicating the difference between the second bit signal of the first plurality of bit signals and the second bit signal of the second plurality of bit signals.

30. A method for shifting a plurality of electrical signals comprising the steps of:

receiving the plurality of electrical signals;

receiving a first plurality of bit signals corresponding to a binary representation of an exponent of a first floating point number and a second plurality of bit signals corresponding to a binary representation of an exponent of a second floating point number, each first plurality of bit signals and second plurality of bit signals comprising a least significant bit (LSB) signal and a plurality of more significant bit (MSB) signals;

comparing the LSB signal of the first plurality of bit signals to the LSB signals of the second plurality of bit signals;

generating an LSB difference signal indicating a difference between the LSB signal of the first plurality of bit signals and the LSB signal of the second plurality of bit signals;

initially selectively shifting the plurality of electrical signals in response to the LSB difference signal;

comparing the plurality of MSB signals of the first plurality of bit signals to the plurality of MSB signals of the second plurality of bit signals at the same time that the LSB signal of the first plurality of bit signals is being compared to the LSB signal of the second plurality of bit signals;

generating a plurality of MSB difference signals indicating a difference between the plurality of signals of the plurality of first bit signals and the plurality of MSB signals of the second plurality of bit signals after the generation of the LSB difference signal;

wherein the plurality of MSB difference signals are initially generated only after the LSB difference signal is initially generated; and further selectively shifting the initially selectively shifted plurality of electrical signals in response to the plurality of MSB difference signals.

31. A method for shifting a plurality of electrical signals comprising the steps of:

receiving the plurality of electrical signals;

receiving a first plurality of bit signals corresponding for a binary representation of an exponent of a first number and a second plurality of bit signals corresponding for a binary representation of an exponent of a second number, each first plurality of bit signals and second plurality of bit signals comprising a least significant bit (LSB) signal and a plurality of more significant bit (MSB) signals;

generating an LSB difference signal indicating a difference between the LSB signal of the first plurality of bit signals and the LSB signal of the second plurality of bit signals;

initially selectively shifting the plurality of electrical signals in response to the LSB difference signal;

generating a plurality of MSB difference signals indicating a difference between the plurality of signals of the plurality of first bit signals and the plurality of MSB signals of the second plurality of bit signals only after the generation of the LSB difference signal; and further selectively shifting the initially selectively shifted plurality of electrical signals in response to the plurality of MSB difference signals;

wherein the MSB difference signal generating step further comprises the step of generating the plurality of MSB difference signals with a plurality of levels of hardware logic.

32. The method according to claim 31 wherein the LSB difference signal generating step further comprises the step of calculating an exclusive-OR combination of the LBS signal of the first plurality of bit signals and the LSB signal of the second plurality of bit signals.

33. The method according to claim 32 wherein the LSB difference signal generating step comprises the step of calculating the exclusive-OR combination of the LSB signal of the first plurality of bit signals and the LSB signal of the second plurality of bit signals with only one level of hardware logic.

34. The method according to claim 33 wherein the first plurality of bit signals corresponds to a binary representation of an exponent of a first floating-point number.

35. The method according to claim 34 wherein the second plurality of bit signals corresponds to a binary representation of an exponent of a second floating-point number.

36. The method according to claim 35 wherein the plurality of electrical signals corresponds to a binary representation of a mantissa of one of the first or second floating point numbers.

37. A method for shifting a plurality of electrical signals comprising the steps of:

receiving the plurality of electrical signals;

receiving a first plurality of bit signals and a second plurality of bit signals corresponding for a binary representation of an exponent of a second number, each first plurality of bit signals and second plurality of bit signals comprising a least significant bit (LSB) signal and a plurality of more significant bit (MSB) signals;

generating an LSB difference signal indicating a difference between the LSB signal of the first plurality of bit signals and the LSB signal of the second plurality of bit signals;

initially selectively shifting the plurality of electrical signals in response to the LSB difference signal;

generating a plurality of MSB difference signals indicating a difference between the plurality of signals of the plurality of first bit signals and the plurality of MSB signals of the second plurality of bit signals only after the generation of the LSB difference signal;

further selectively shifting the initially selectively shifted plurality of electrical signals in response to the plurality of MSB difference signals;

wherein the plurality of electrical signals further comprises:
a first extra electrical signal appended to a least significant electrical signal of the plurality of electrical signals;
a second extra electrical signal appended to the first extra electrical signal; and
a third extra electrical signal appended to the second extra electrical signal.

38. The method according to claim 37 further comprising the step of generating the third extra electrical signal for further selecting shifts of the plurality of electrical signals.

39. The method according to claim 38 further comprising the step of generating the first extra electrical signal for the initial selective shift of the plurality of electrical signals.

40. The method according to claim 39 wherein the third extra electrical signal generating step comprises the step of generating the third extra electrical signal for a second selective shift of the plurality of electrical signals as a logical AND of the first extra electrical signal from the initially selectively shifted plurality of electrical signals with a signal indicating a difference between an MSB signal pair from the first plurality of bit signals and the second plurality of bit signals.

41. The method according to claim 40 further comprising the step of generating the first extra electrical signal for further selective shifts of the plurality of electrical signals.

42. The method according to claim 41 wherein the step of generating the first extra electrical signal comprises, for some integer N greater than one, generating the first extra electrical signal for an Nth shift as $(A*B)+(C*D)$ wherein:

A is the value of the first extra electrical signal for the $(N-1)$th selective shift;

B is an inverted signal indicating the difference between the Nth bit signal of the first plurality of bit signals and the Nth bit signal of the second plurality of bit signals;

C is the value of the $2^{(N-1)}$th electrical signal from the $(N-1)$th selectively shifted plurality of electrical signals;

D is a signal indicating the difference between the Nth bit signal of the first plurality of bit signals and the Nth bit signal of the second plurality of bit signals;

\* represents a logical AND operation; and

\+ represents a logical OR operation.

43. The method according to claim 42 further comprising the step of generating the second extra electrical signal for further selective shifts of the plurality of electrical signals.

44. The method according to claim 43 wherein the step of generating the second extra electrical signal for further selective shifts of the plurality of electrical signals comprises the step of generating the second extra electrical signal for the second shift as the logical AND of the first electrical signal of the initially selectively shifted plurality of electrical signals with a signal indicating the difference between an MSB signal pair of the first plurality of bit signals and the second plurality of bit signals.

45. The method according to claim 44 wherein the step of generating the second extra electrical signal comprises, for some integer M greater than two, generating the second extra electrical signal for an Mth selective shift as (E*F)+(G*H) wherein:

E is the value of the second extra electrical signal from the (M−1)th shift;

F is an inverted signal indicating the difference between the Mth bit signal of the first plurality of bit signals and the Mth bit signal of the second plurality of bit signals;

G is the value of the $(2^{(M-1)}-1)$th electrical signal of the (M−1)th selectively shifted plurality of electrical signals; and H is a signal indicating the difference between the Mth bit signal of the first plurality of bit signals and the Mth bit signal of the second plurality of bit signals.

46. The method according to claim 45 wherein the step of generating the third extra electrical signal comprises, for some integer L greater than two, generating the third extra electrical signal for an Lth selective shift as P+Q*(R+S+T) where P represents the value of the third extra electrical signal for the (L−1)th selectively shifted plurality of electrical signals;

Q represents a signal indicating the difference between the Lth bit signal of the first plurality of bit signals and the Lth bit signal of the second plurality of bit signals;

R represents the logical OR of the $(2^{(L-1)}-2)$ least significant electrical signals from the (L−1)th selectively shifted plurality of electrical signals;

S represents the first extra electrical signal from the (L−1)th selective shift; and T represents the second extra electrical signal from the (L−1)th selective shift.

47. The method according to claim 46 wherein the step of generating the first extra electrical signal for the initial selective shift of the plurality of electrical signals comprises the steps of generating the first extra electrical signal for the initial selective shift of the plurality of electrical signals as the logical AND of the LSB signal of the unshifted plurality of electrical signals with a signal indicating the difference between the LSB signal of the first plurality of bit signals and the LSB signal of the second plurality of bit signals.

48. The method according to claim 47 further comprising the step of generating the third extra electrical signal for the initial selective shift of the plurality of electrical signals.

49. The method according to claim 48 wherein the step of generating the third extra electrical signal for the initial selective shift of the plurality of electrical signals comprises the step of setting the value of the third extra electrical signal equal to zero for the initial selective shift of the plurality of electrical signals.

50. The method according to claim 49 wherein the LSB difference signal generating step further comprises the step of generating a signal indicating an exclusive-OR combination of the LSB signal of the first plurality of bit signals and the LSB signal of the second plurality of bit signals.

51. The method according to claim 50 wherein the LSB difference signal generating step comprises the step of generating a signal indicating the exclusive-OR combination of the LSB signal of the first plurality of bit signals and the LSB signal of the second plurality of bit signals with only one level of hardware logic.

52. The method according to claim 39 wherein the step of generating the first extra electrical signal for the initial selective shift of the plurality of electrical signals comprises the steps of generating the first extra electrical signal for the initial selective shift of the plurality of electrical signals as the logical AND of the LSB signal of the unshifted plurality of electrical signals with a signal indicating the difference between the LSB signal of the first plurality of bit signals and the LSB signal of the second plurality of bit signals.

53. The method according to claim 52 further comprising the step of generating the third extra electrical signal for the initial selective shift of the plurality of electrical signals.

54. The method according to claim 53 wherein the step of generating the third extra electrical signal for the initial selective shift of the plurality of electrical signals comprises the step of setting the value of the third extra electrical signal equal to zero for the initial selective shift of the plurality of electrical signals.

55. The method according to claim 54 wherein the LSB difference signal generating step further comprises the step of generating a signal indicating an exclusive-OR combination of the LSB signal of the first plurality of bit signals and the LSB signal of the second plurality of bit signals.

56. The method according to claim 55 wherein the LSB difference signal generating step comprises the step of generating a signal indicating the exclusive-OR combination of the LSB signal of the first plurality of bit signals and the LSB signal of the second plurality of bit signals with only one level of hardware logic.

* * * * *